United States Patent
Sasson

(10) Patent No.: US 6,332,161 B1
(45) Date of Patent: Dec. 18, 2001

(54) CUSTOMER WEB LOG-IN ARCHITECTURE

(75) Inventor: Gideon Sasson, Palo Alto, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 09/161,325

(22) Filed: Sep. 25, 1998

(51) Int. Cl.[7] ............................................. G06F 15/16
(52) U.S. Cl. ................................... 709/227; 709/203
(58) Field of Search ................................. 709/203, 223, 709/205, 224, 225, 227, 104, 105; 713/200, 201, 202

(56) References Cited

U.S. PATENT DOCUMENTS

| | | | |
|---|---|---|---|
| 5,222,235 | * 6/1993 | Hintz et al. | 707/101 |
| 5,535,276 | 7/1996 | Ganesan . | |
| 5,574,895 | * 11/1996 | Lee et al. | 713/500 |
| 5,581,555 | * 12/1996 | Dubberly et al. | 370/487 |
| 5,636,139 | * 6/1997 | McLaughlin et al. | 709/219 |
| 5,644,789 | * 7/1997 | Matthews et al. | 710/36 |
| 5,774,551 | 6/1998 | Wu et al. . | |
| 5,815,662 | * 9/1998 | Ong | 709/217 |
| 5,854,754 | * 12/1998 | Cabrera et al. | 364/578 |
| 5,867,652 | * 2/1999 | Hurvig | 709/203 |
| 5,892,818 | 4/1999 | Lee . | |
| 5,894,560 | * 4/1999 | Carmichael et al. | 710/25 |
| 5,919,247 | 7/1999 | Van Hoff et al. . | |
| 5,969,704 | * 10/1999 | Green et al. | 345/113 |
| 5,974,392 | * 12/1999 | Endo | 705/8 |
| 5,978,802 | * 11/1999 | Hurvig | 707/8 |
| 5,987,513 | * 11/1999 | Prithviraj et al. | 709/223 |
| 5,991,878 | * 11/1999 | McDonough et al. | 713/200 |
| 6,005,850 | * 12/1999 | Moura et al. | 370/282 |
| 6,006,332 | * 12/1999 | Rabne et al. | 713/201 |
| 6,011,537 | * 1/2000 | Slotznick | 345/115 |
| 6,061,504 | * 5/2000 | Tzelnic et al. | 709/219 |
| 6,070,190 | * 5/2000 | Reps et al. | 709/224 |
| 6,101,508 | * 8/2000 | Wolff | 707/218 |

OTHER PUBLICATIONS

Cardone, J. *International Preliminary Examination Report,* Apr. 4, 2001, 2 pages.

* cited by examiner

*Primary Examiner*—Zarni Maung
*Assistant Examiner*—Jason D. Cardone
(74) *Attorney, Agent, or Firm*—Innovation Partners; Charles E. Gotlieb

(57) ABSTRACT

A system and method of (1) creating a temporal queue in which responses to multiple client requests received simultaneously, or nearly simultaneously, by a server computer include indications of periods of time such that subsequent rounds of client requests are staggered in time, and (2) notifying system users of the status of their messages with respect to the temporal queue. A log-in request is transmitted from a user to the server computer. In response, a message containing an estimate of the period of time required for prior threads to conclude is sent. The user is notified of the remaining time left in the temporal queue. Upon the expiration of the period of time, the thread continues with further messages.

26 Claims, 8 Drawing Sheets

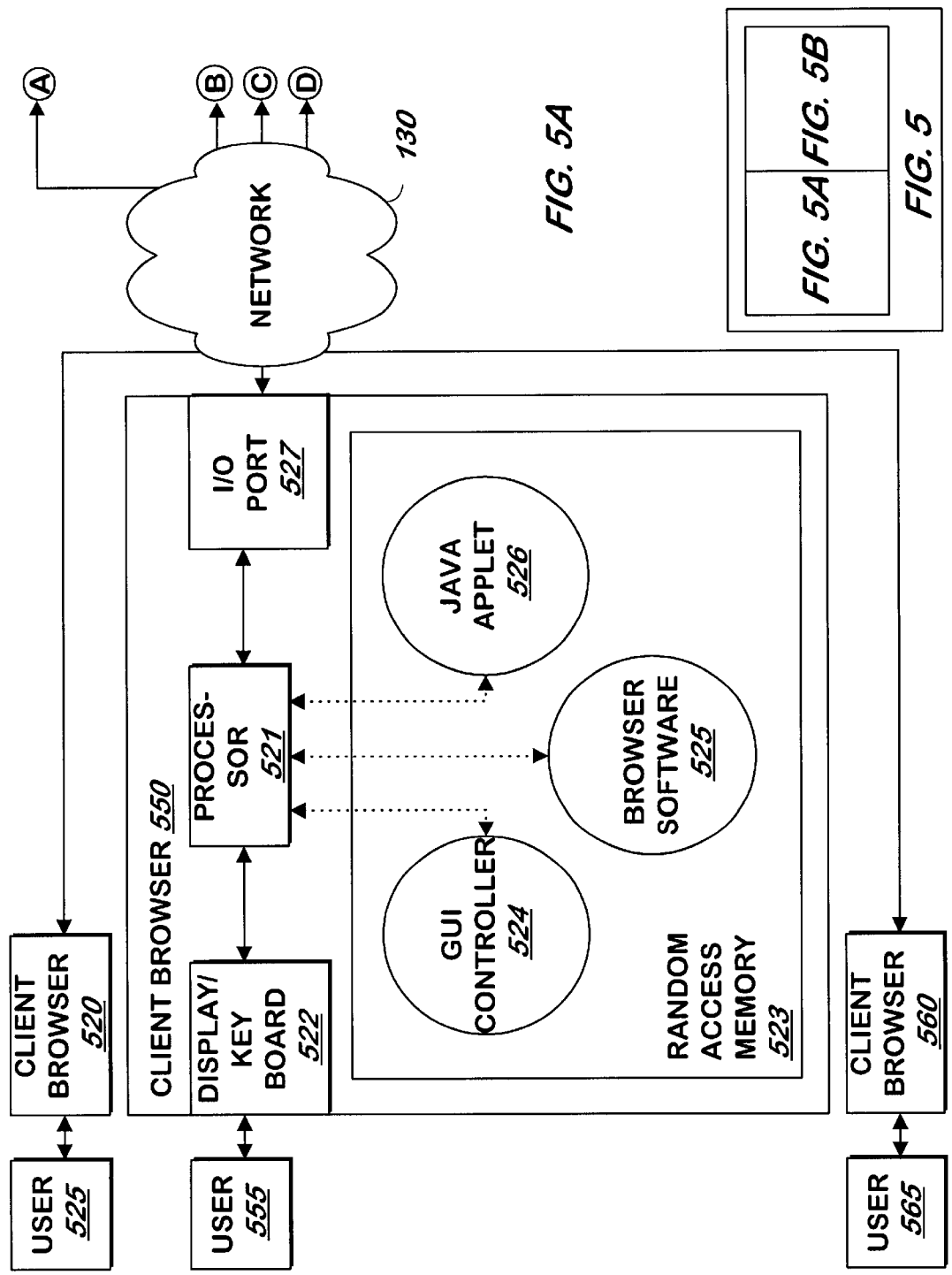

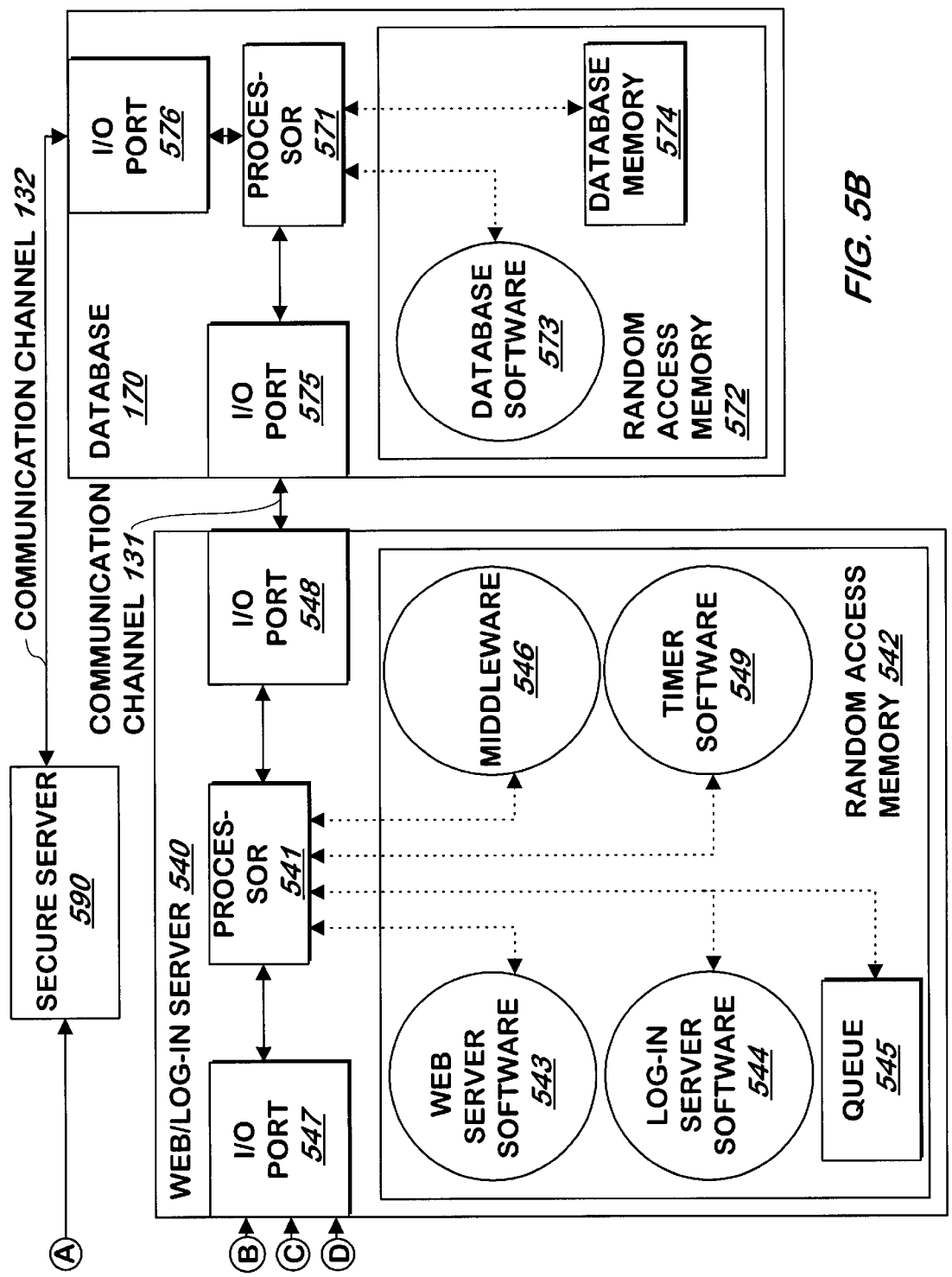

CUSTOMER WEB LOG-IN ARCHITECTURE

FIELD OF THE INVENTION

The present invention relates to the synchronization of messages sent by multiple computers to a single computer, and more specifically to the staggering of client requests to a server computer in a network system.

BACKGROUND OF THE INVENTION

Over the past few years, online banking and commerce have become increasingly important and widespread. Typically, such activities are conducted over networks, such as the Internet, and comprise transaction communications between the users of browser computers and server computers associated with databases. For example, users may be customers of a financial institution, such as a bank or a brokerage firm, which stores customer account information in a database. Increasingly, such information is made available to the customers for online transactions, such as balance inquiries and fund transfers. During off-peak hours, a single customer may easily access the appropriate database. From time-to-time, however, market forces will cause multiple customers to simultaneously seek online transactions. At such times, long delays in customer log-in and transaction requests may be encountered.

Such delays are due to two complications. The first complication is simply the high volume of requests received by the server during such periods. In order to process the requests in an orderly fashion, the server holds the requests in a first-in-first-out request queue. Once a request is serviced, the server proceeds to the next request. This technique produces long queues when numerous requests are received by the server. The second complication is the stateless nature of the Web environment and the HTTP protocol. Since the protocol is stateless, each request from a client requires a new connection to the server. Because most customer sessions include multiple requests and responses, high-volume periods further delay the progress of each session.

For example, a customer may request to (1) log-in, (2) receive a balance statement, (3) transfer funds, and (4) initiate a trade. This session requires at least four client requests and server responses. During high-volume periods, the stateless nature of the HTTP protocol requires each of the four requests to compete with all other requests to log-in or transact. In other words, even after a log-in has been established by request (1), requests (2)–(4) are placed at the end of the queue and do not receive priority over log-in requests from other customers. In contrast, if the same session were performed via a telephone call, all requests and responses subsequent to the initial dial-in request (which is functionally analogous to a computer log-in request) are passed over a dedicated phone line without interruption or delay from other customers trying to dial in.

As a result, each web-based request for an interaction, including requests for quotes, balances, trades, etc., must compete with the log-in attempts and requests of others. Furthermore, as a transaction or log-in request is delayed by others, the requesting software may time out and indicate to the customer that the request should be made again, or the customer may decide to abort the current request and initiate a retry. In either case, the load on the server system increases. In contrast, a customer who attempts to make a phone call to an institution whose phone connections are currently in use will receive a status message in the form of a busy signal. Typically, the customer will then hang up and try again after a period of time has lapsed. Significantly, transactions occurring on dedicated phone lines are not interrupted or delayed as they may be in web-based transactions.

Thus, if each server log-in request were required to wait until current transactions are complete, and if each customer with a waiting request were notified of the status of the request, transaction delays and repeated requests would be diminished and largely eliminated

SUMMARY OF THE INVENTION

The present invention comprises a system and method of (1) creating a temporal or virtual queue in which message threads between a server and clients are staggered in time by server instructions to delay subsequent rounds of client requests until current threads have concluded, and (2) notifying client users of the status of their messages with respect to the temporal queue. The method comprises the transmission of a log-in initiation request from a user to a server computer, responding to the initiation request with a message containing an estimate of the period of time required for prior threads to conclude, and notifying the user of the remaining time left in the temporal queue.

FIGS. (5A and 5B) shows a block diagram of a network system in accordance with the present invention.

Figure 6:
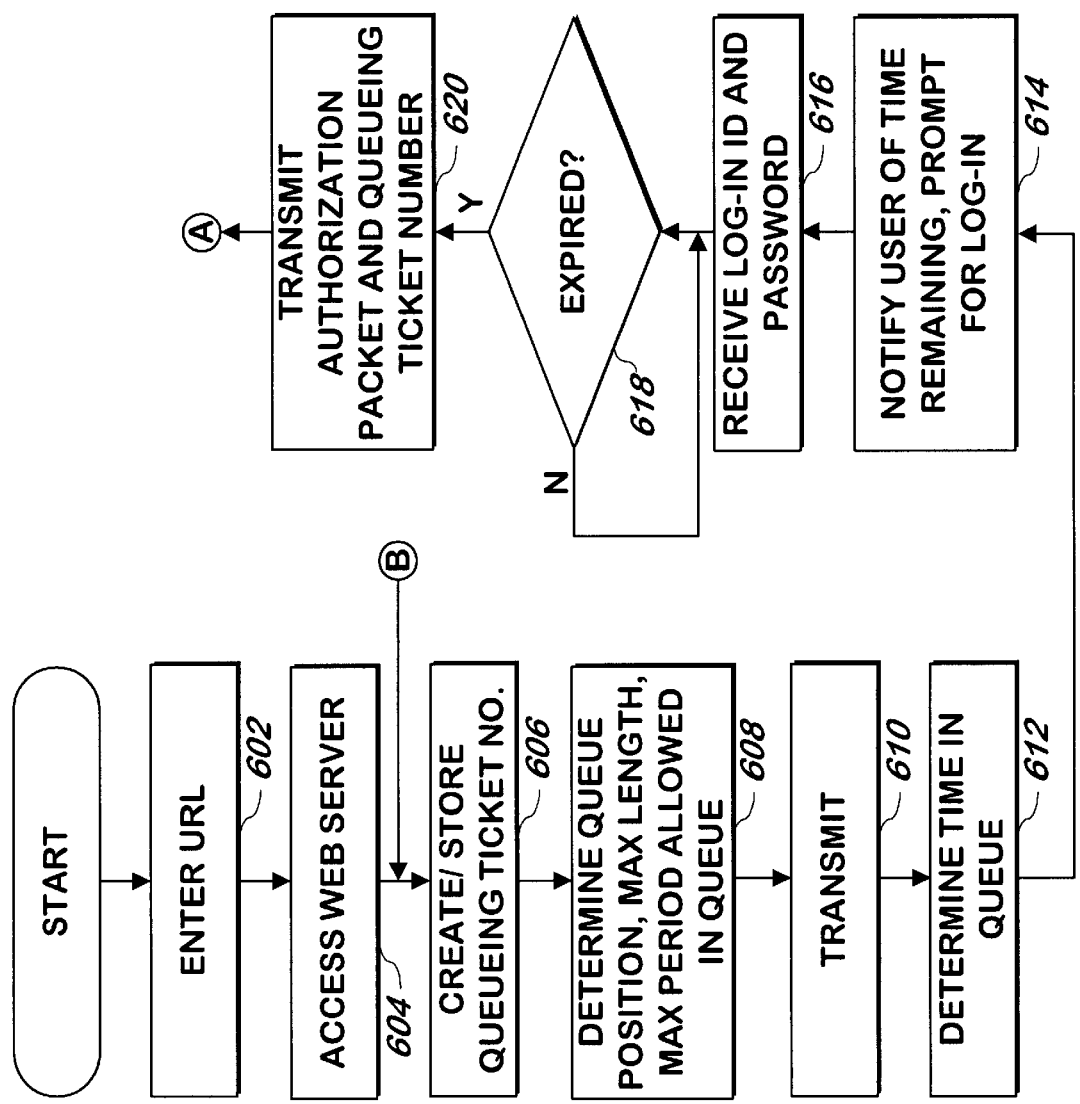

FIG. 6 shows a flow diagram of a method for queuing a message thread in the temporal queue in accordance with the present invention.

Figure 7:
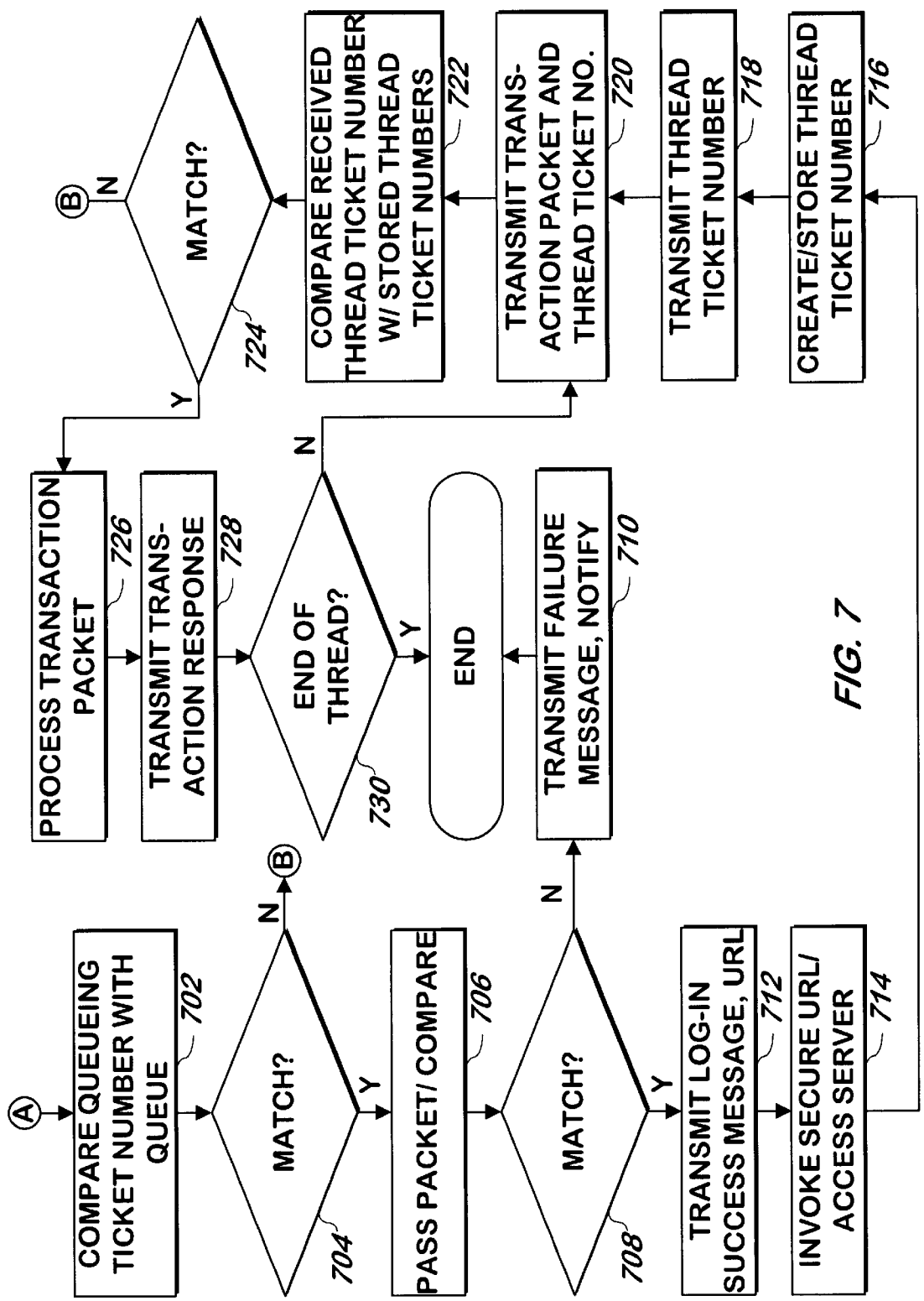

FIG. 7 shows a flow diagram of a method for processing a queued message thread in accordance with the present invention.

DETAILED DESCRIPTION

Figure 1A:
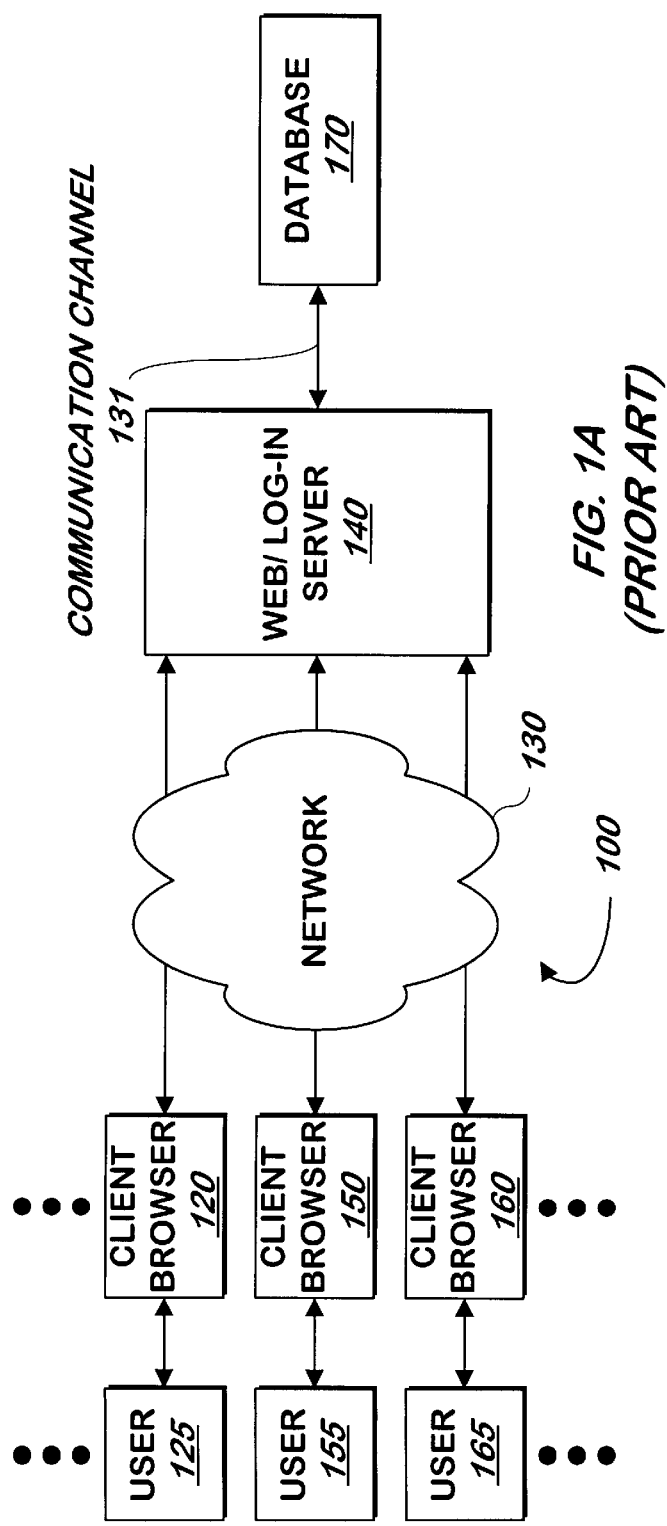
FIG. 1A shows a block diagram of a conventional network system.

Shown in FIG. 1A is a conventional network system 100. System 100 comprises browser computers 120, 150, and 160 and a server computer 140, each of which are connected to network 130 (which, for example, can be the Internet, a wide area network, or local area network). A database 170 is connected to the server computer by communication channel 131. Typically, the database computer is maintained by an institution, such as a bank or brokerage firm, for storing information on customer accounts and transactions. The server computer, also associated with the institution, acts as an entry to the database for remotely located customers. For example, customer 125, using browser 120, can send over the network and to the server a request to log-in to the database. Once the customer's identification and password have been authenticated, the customer is permitted to log-in and transact with the database.

Figure 1B:
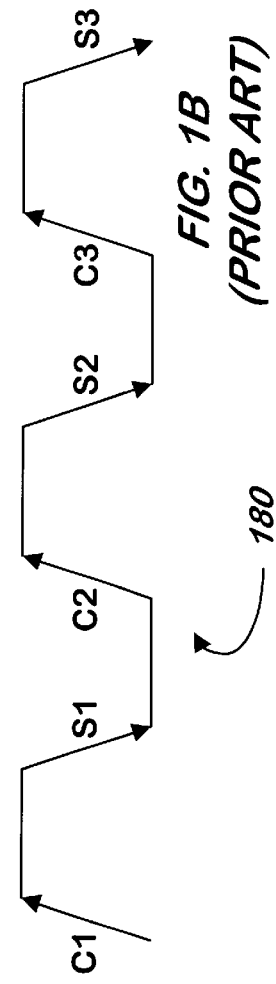
FIG. 1B shows a timing diagram for a typical message thread produced by the system of FIG. 1A.

Typically, a customer transaction with database 170 will require several communications between the associated client and server computers. For example, user 125 may desire to (1) log-in, (2) receive a balance statement, and (3) transfer funds. These communications form a thread of at least three request messages and associated replies between client 120 and server 140 (as discussed below, the log-in procedure alone requires a number of message exchanges). As shown in FIG. 1B, the thread can be depicted in a timing diagram. Vectors C(lient)1, C2, and C3 represent messages sent from the client to the server, while vectors S(erver)1, S2, and S3 represent the respective responses from the server to the client. The horizontal lines represent time spent by either the server/database (the upper horizontal lines) or the client/user (the lower horizontal lines) in processing received messages.

Figure 2:
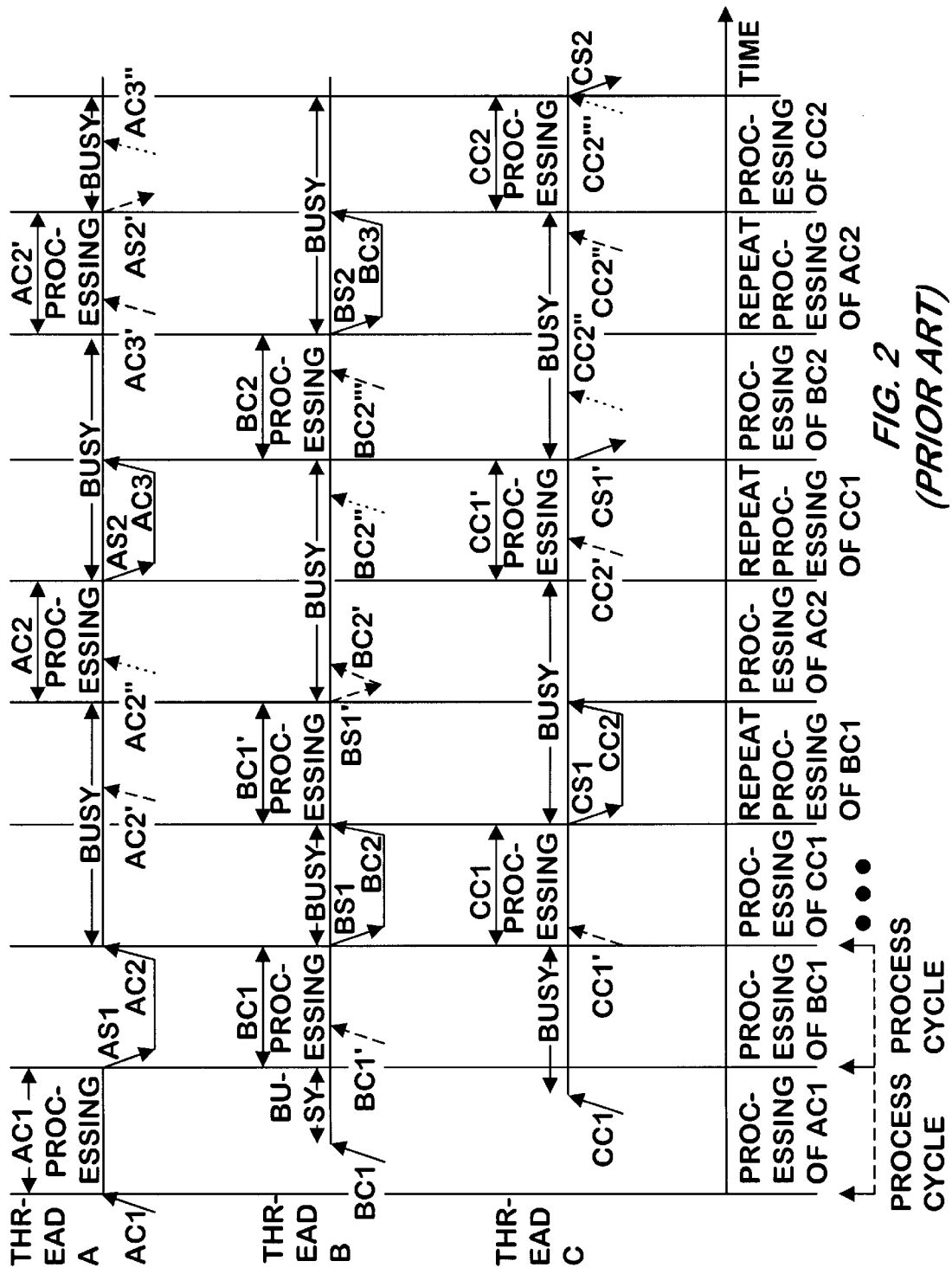
FIG. 2 shows a timing diagram for multiple message threads produced by the system of FIG. 1A.

FIG. 2 is a timing diagram that shows the complications that can arise when multiple users attempt to transact with a single database. It is noted that while problems typically arise when hundreds of simultaneous or nearly simultaneous transactions are attempted through tens of possible connections to a database, only three transaction threads competing for one connection are shown. This is solely for purposes of explanation and is not intended to limit the invention in any way. The first thread, thread A, is established with request AC1 from client 120 to server 140. As with the first request of thread 180 in FIG. 1A, request AC1 makes a timely connection with server 140 and database 170 and, after appropriate message processing, is serviced with reply AS1. After processing reply AS1, client 120 sends a second message, AC2.

While request AC1 is being serviced, client 150 initiates a second thread, thread B, with a first message, BC1. Since, however, the only possible connection to database 170 is currently busy with thread A, BC1 is forced to wait in a queue while AC1 is being processed by server 140 and database 170. Only after sending reply AS1, is database 170 able to process BC1. As a result, client 150 and user 155 do not receive reply BS1 until nearly twice the normal (i.e. non-queued) amount of time has passed. If in the meantime either client 150 times out or user 155 becomes sufficiently frustrated, a repeat message, BC1', is sent before the client receives BS1. This, however, rather than resolving the problem merely complicates it, since the server must now process a total of three messages (AC1, BC1, and BC1') from threads A and B, rather than two.

Even more complications arise if client 160 initiates thread C with message CC1 while message AC1 is being processed and BC1 is waiting in queue. Since BC1 is already in queue, CC1 is placed behind it, forcing client 160 and user 165 to wait through the completion of the processing of AC1 and BC1 before the processing of CC1 may begin. Unaware of the cause of the delay, client 160 or user 165 may send a retry message, CC1', further confusing the situation. At this point, the server must contend with a total of five messages, two of which are repeats.

Unfortunately, the result of this circumstance is that no one client is adequately served in a timely manner. As shown by AC2 and AC3, even the first client, client 120, is unable to complete three rounds of communications in the ten service cycles shown. This is due to two reasons: (1) since no precedence is established between the threads, each message from thread A is forced to wait for all preceding messages (whether from itself or from threads B or C; whether original messages or repeats) to be processed (for example, AC3 must wait through the servicing of AC2', AC2'', BC2, BC2', BC2'', CC1', CC2, and CC2'), and (2) since clients 120, 150, and 160 receive no feedback from server 140 regarding the status of the respective messages, repeat messages abound (AC2', AC2'', AC3', AC3'', BC1', BC2', BC2'', BC2''', CC1', CC2', CC2'', CC2''', CC2$^{iv}$).

Figure 3:
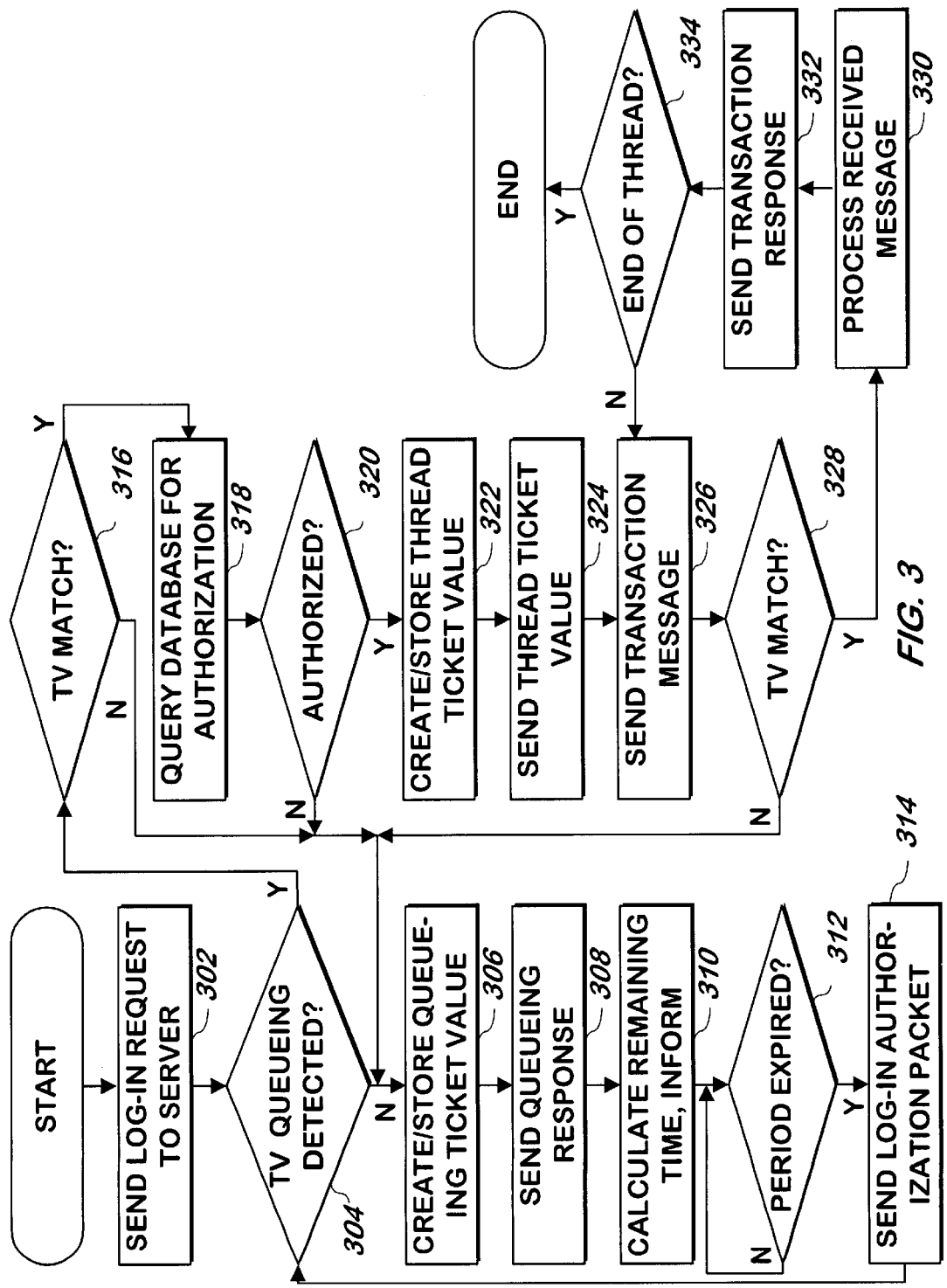
FIG. 3 shows a flow diagram of a method for queuing message threads in accordance with the present invention.

Shown in FIG. 3 is a flowchart of a method in accordance with the present invention which overcomes the two problems stated in the previous paragraph. This is achieved by staggering each thread in a temporal queue such that the processing of each thread is delayed until all prior threads are complete. For purposes of this discussion, it is assumed that the order of the threads is that shown in FIG. 2, namely thread A (created by client 120) precedes thread B (created by client 150) which precedes thread C (created by client 160). In step 302, a client computer, such as client 150, sends a log-in message to a server, such as server 140. In step 304, server 140 determines that the log-in message has no queuing ticket number, and so assigns one to the new request in step 306. The queuing ticket number is a unique number that is used to identify the request during future request-related communications. Server 140 saves the queuing ticket number in order to identify future communications from the same request. In step 308, the server returns to the client a message containing the queuing ticket number and an indication of a period of time. This period of time is an estimate of the amount of time required to complete all prior transaction threads, in this case thread A. Once these prior threads have concluded, the server can fully service the client in question.

Figure 4:
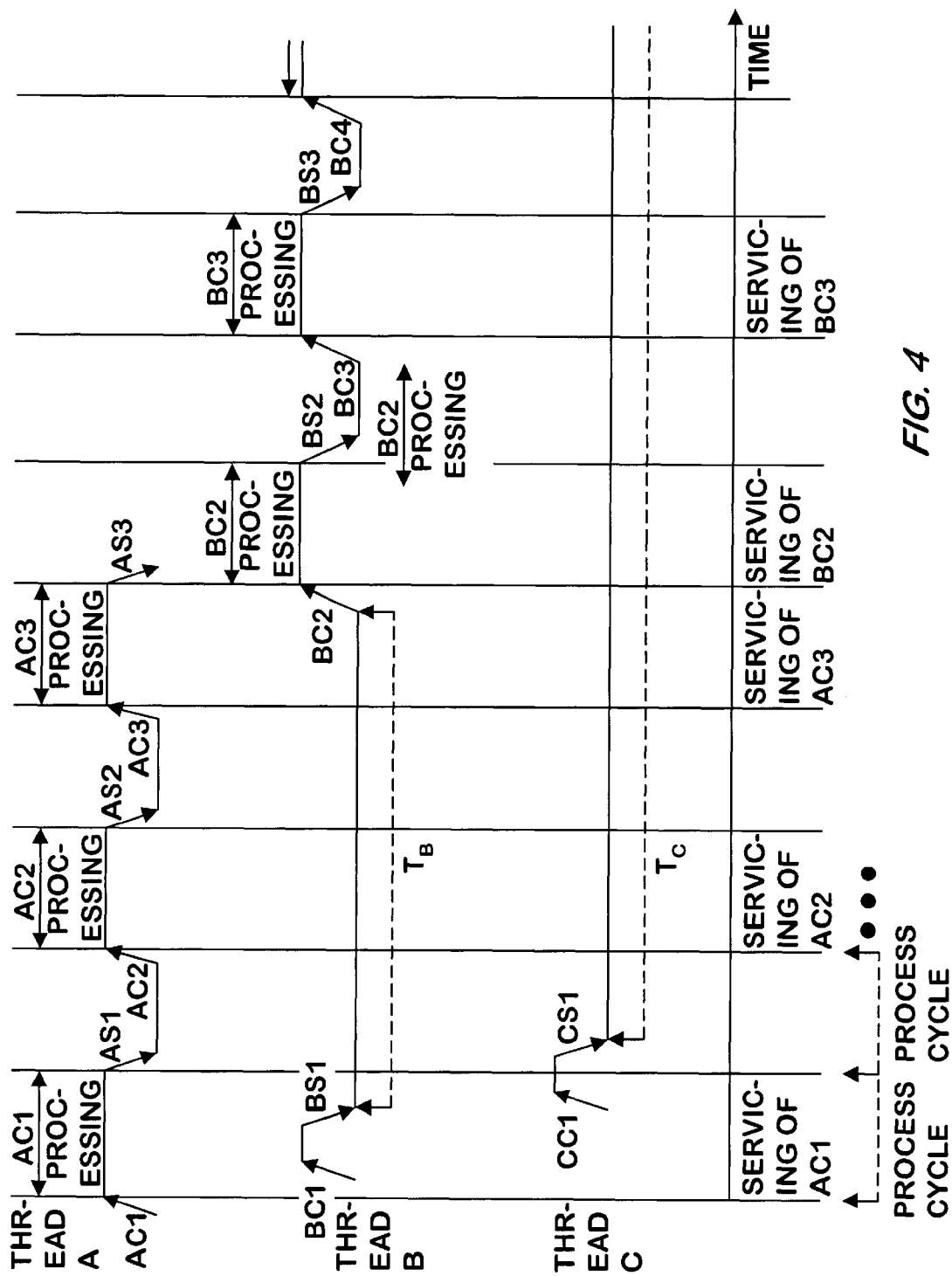
FIG. 4 shows a timing diagram for multiple message threads produced by a method in accordance with the present invention.

For example, shown in FIG. 4 is a timing diagram showing threads A, B, and C as synchronized by the method outlined in FIG. 3. In accordance with step 302, client 150 sends a log-in request (message BC1) to server 140. Rather than wait for the server to complete the servicing of AC1, server 140 sends to client 150 message BS1 which contains a ticket number and a quantity indicative of a period of time. This period, $T_B$, is the estimated amount of time for prior threads, in this case thread A, to be completed. Later threads are provided with time periods that include estimates of the time to be taken by threads A and B. For example, thread C is initiated with message CC1 and reply CS1. CS1 contains a greater time estimate, $T_C$, than $T_B$, since $T_C$ must account for the processing of thread B. Since the continuation of threads B and C are staggered, a temporal or virtual queue is established.

In an alternative embodiment, groups of threads, each group comprising a number of queued or non-queued threads, are queued in the manner described in FIGS. 3 and 4. In this embodiment, each group of threads is instructed to wait for further processing until all prior groups have been processed. In addition, whether applied to individual threads or groups of threads, the method described in FIGS. 3 and 4 is typically triggered only when the number of current connections currently being serviced by server 140 has reached a predetermined threshold (i.e. 95% of the connections to server 140 are busy servicing other messages). Alternatively, the method may be applied on a routine basis for the processing of all threads, regardless of whether server 140 is busy.

Returning to FIG. 3, in step 310, the client computer notifies the user of the estimated period of time until true processing of the thread may begin. Thus, although the user is forced to wait, feedback is provided and retry messages are forestalled. In step 312, the client computer determines when the period of time has expired, and in step 314 a log-in authorization message, typically containing the user's personal identification and password, is sent to the server from the client. This message contains the queuing ticket number assigned by the server in step 306. The process then returns to step 304 in which server 140 detects the queuing ticket number in the second message and proceeds to step 316.

In step 316, server 140 compares the detected queuing ticket number with those it has stored in local memory. If the ticket value does not match, the server treats the message as a log-in attempt and returns to step 306. If the detected ticket number coincides with a stored one, the ticket is valid and the process continues at step 318. In step 318, server 140 passes the user's personal identification and password to database 170 for confirmation that the user is authorized to access the database. If the database query fails to result in a user authorization, the process returns to step 306 for a new queuing ticket. If, however, database 170 determines that the user is authorized, server 140 creates and stores in local memory a thread ticket value which is used to identify all future communications from the new thread. In step 324, server 140 sends a thread ticket containing the ticket value to Client 150.

Once server 140 is in possession of the thread ticket value, the processing of the remaining thread communications is straight forward. In step 326, Client 150 sends a message containing the thread ticket value to server 140. Upon receiving the message, server 140 determines whether the thread ticket value matches any of the thread ticket values held in local storage. If the received value does not match any of the stored values, the process returns to step 306 where the received message is treated as a log-in request message. If, however, a match is made between the received ticket value and one of those in local storage, the corresponding thread is identified and the received message is processed accordingly by the server and database 170 in step 330. In step 332, server 140 sends a response to Client 150.

If the user decides to continue the thread in step 334, Client 150 is instructed to continue the process at step 326 by sending another message to server 140. Since the message is a continuation of the thread, the thread ticket value is included in the transmission. Steps 326 through 334 are repeated as many times as necessary to complete the thread. Once complete, the thread is discontinued in step 334. Typically, the length of the thread is left to the discretion of the user, but in an alternative embodiment, threads are limited to a certain number of communications.

Returning to FIG. 4, it can be seen that steps 302 through 308 coincide with messages BC1 and BS1, while steps 310 and 312 coincide with time $T_B$. BC2 is then sent in step 314, which, after authorization in steps 304 and 316 through 322, elicits reply BS2 in step 324. Messages BC3, BS3, BC4, and BS4 are then produced by steps 326 through 334. Once the thread is complete, the process comes to an end.

Thread C also coincides with the steps in FIG. 3, although the estimated time, $T_C$, is significantly longer than $T_B$. It is noted that in contrast to the conventional technique depicted in FIG. 2, thread A is completed in five processing cycles, while thread B is completed in ten. Furthermore, since each customer in the temporal queue is informed in step 310 of the remaining time, the rationale for sending repeat messages is eliminated.

Referring to FIG. 5, a detailed block diagram of a system in accordance with the present invention is shown. The system comprises clients 520, 550, and 560, servers 540 and 590, a database 170, and a network 130. Although only three clients are shown and discussed, the present invention is not limited to this configuration and can include any number of clients. Client browser 550 comprises processor 521, display/keyboard 522, random-access-memory (RAM) 523, and input/output (I/O) port 527. The browser is connected to network 130 by the I/O port. Initially, the memory contains two software modules: graphical user interface (GUI) module 524, used by the processor to render and control a GUI on the display, and browser module 525, used by the processor for accessing other computers over the network. During the initial connection to server 540, a third software module, Java Applet 526, is received from the server and stored in the memory. The Applet is used for further communications with the server. Clients 520 and 560 are configured in a similar manner.

Web/log-in server 540 comprises processor 541, random-access-memory (RAM) 542, and I/O ports 547 and 548. The server is connected to network 130 by I/O port 547 and to database 170 by I/O port 548. Memory 542 contains queue 545 and three software modules: web server module 543, log-in server module 544, and middleware module 546. The processor uses web server module 543 to provide web-based services such as the transmission of web-site information, graphics, instructions, and input prompts, as well as the reception of user instructions and information from clients, such as browser 550, over network 130.

Processor 541 accesses log-in server module 544 to process log-in requests from users. In one embodiment, server module 544, in normal operation, behaves in the conventional manner described in FIGS. 1A and 1B. When a predetermined maximum number of log-in messages are received, however, the log-in server module instructs processor 541 to create and store queuing numbers in queue 545 for each received log-in request and to generate and transmit queuing responses to the respective users. For example, if a log-in request is transmitted from user 555 to processor 541 via client 550 and network 130, the request is received and processed by processor 541 while executing module 543. Once the processor has received the log-in request and generated an associated queuing number, module 544 instructs the processor to store the queuing number in the next available address of queue 545 and to determine parameters for the estimation of the period of time for the completion of all prior threads. This information, with Applet 526, is transmitted as a queuing response to client 550. Once installed, the Applet calculates, as discussed below in FIG. 6, and notifies user 555 of the remaining period of time until servicing can begin. After the indicated period of time has expired, the Applet replies with a log-in authorization packet. Upon receiving the authorization packet, module 544 instructs processor 541 to pass the packet to database 170 for verification.

Database 170 is connected to computer 540 by communication channel 131 and comprises processor 571 and RAM 572. Memory 572 includes database memory 574 and a database query module 573. Database memory 574, which is accessed by processor 571 contains user log-in information and associated content, such as customer account information. Upon receiving a user's log-in authorization packet from server 540, processor 571 scans the database indices for a match with the customer's identification. Once found, it compares the corresponding stored password with that received from the customer. The comparisons terminate either upon finding a match with a stored index and a match or a mismatch with the corresponding password, or upon comparing each of the index fields without finding a match. In the case of a complete match, computer 571 sends a log-in-success message and the address of server 590 to user 555 via the network, while in the case of a mismatch of the identification or password it transmits a log-in-failure message.

Once a log-in success has been achieved, all future communications from the same thread are resolved by secure server 590. User 555 instructs client 550 to access the secure server. Upon being accessed, server 590 creates and stores a unique thread ticket number for identifying all future messages from the present thread. The thread ticket number is then transmitted to Applet 521/526 for appendage to subsequent messages. Messages are then sent back and forth between the client and the secure server until the thread is completed. Each message from the client includes the thread ticket number so that the secure server can identify the message and associate it with the proper thread.

In step 720, user 555 instructs Applet 521/526 to transmit to server 590 a transaction packet for processing by database 170. Appended to the packet is the unique thread ticket value assigned to the present thread in step 716. In step 722, the server receives the packet, detects the ticket, and compares the ticket number with those stored in local memory. If the ticket number in question does not match any of those in memory, the process returns in step 724 to step 606 in which the message is treated as a log-in request and a new queuing ticket number is generated. If however, a match is located, the process continues in step 726 in which the server and the database process the packet. Upon completion of the processing, a response is returned to Applet 521/526 in step 528. If the user chooses to terminate the thread at this point, the process ends at step 730. If, however, the customer chooses to continue, steps 720 through 730 are repeated.

FIGS. 6 and 7 show flow diagrams of a method in accordance with the present invention. It is noted that at certain points, these figures contain combined reference numbers, such as "Browser 521/525." The first reference number of the number pair refers to a processor, while the second refers to the software module being executed by the processor. Thus, "Browser 521/525" refers to processor 521 executing browser software module 525. In addition, as noted above in the discussion of FIGS. 3 and 4, the method described in FIGS. 6 and 7 is typically triggered only when the number of current connections currently being serviced by server 540 has reached a predetermined threshold (i.e. server 540 is busy with other threads). Alternatively, the method may be applied on a routine basis for the processing of all threads, regardless of whether server 540 is busy.

FIG. 6 shows a flow diagram of a routine for queuing a message thread. The routine is initiated at step 602. A user, such as user 555, enters a log-in request into browser, such as browser 521/525, via a graphical user interface such as GUI 521/524 presented on display 522. The request contains an indication of the web site to be accessed. In response to receiving this information, browser 521/525 invokes in step 604 the Uniform Resource Locator (URL) of the indicated website. For example, user 555, wishing to interact with database 170, invokes the URL corresponding to web server 541/543.

In step 606, log-in server 541/544 generates a unique queuing ticket number and places it at the end of queue 545. In step 608, log-in server 541/544 determines the parameters to be used in making an estimate of the period of time remaining in the queue for the ticket in question. In step 610, server 541/544 transmits to processor 521 the parameters, the ticket number, and a communications software module 526. Typically, module 526 is written as a Java Applet and is used by processor 521 for communicating with log-in server 541/544. Once received by processor 521, the Applet is installed and, in step 612, calculates the estimated period of time in the queue. Alternatively, the server may perform the calculation and transmit the result to the Applet.

The period of time may be estimated in a number of ways. In one embodiment of the present invention the following equation is used:

$$T = T_o \times (n/n_o),$$

where
$T_o$=a predetermined maximum period of time allowed in the virtual queue;
n=the ticket's queue position;
$n_o$=a predetermined maximum queue length. It is noted that the same equation can be used by the server if it is to perform the time calculation.

In step 614, Applet 521/526 notifies user 555 of the remaining time to be spent in the queue and prompts the user for log-in authorization information. The user enters the information through GUI 521/524 in step 616. In one embodiment, this information comprises a log-in identification, such as an account number, and a password, although one of ordinary skill in the art will recognize that other schemes can be used. Upon receiving the information, Applet 521/526 waits at step 618 for the estimated period of time to pass before transmitting the information and the ticket number as a log-in authorization packet to log-in server 541/544 in step 620.

FIG. 7 shows a flow diagram for processing a queued message thread. Upon receiving the log-in authorization packet from step 620, log-in server 541/544 determines the presence of a ticket number and, in step 702, matches it with those held in queue 545. If the ticket number in question does not match any of those in the queue, the process returns in step 704 to step 606 where a new ticket number is generated. If the ticket number matches one of those in the queue, the process continues at step 706, in which the log-in authorization packet is passed to database processor 571 for comparison with user identification and passwords stored in memory 574.

Log-in server 541/544 determines in step 708 whether the response from database processor 571 indicates that a match was found for the log-in authorization packet. If no match was made, log-in server 541/544 transmits in step 710 a log-in failure message to Applet 521/526 and the process ends. The user can then reinitiate the process from step 602. Alternatively, the server may accompany the log-in-failure message with a prompt for the retransmission of the identification and password information. The process would then continue at step 620 and bypass the delay period of step 618.

If on the other hand, database 170 indicates that the customer's identification and password matches the corresponding fields of a stored record, log-in server 541/544 transmits to Applet 521/526, in step 712, a log-in success message and the URL of secure server 590 connected to database 170 by communication channel 132. From this point, the customer transacts with database 170 via the secure server. In step 714, Applet 521/526 invokes the URL, thus establishing a connection with the secure server. Upon being accessed, server 590, in step 716, creates and stores a unique thread ticket number for identifying all future messages from the present thread. The thread ticket number is then transmitted in step 718 to Applet 521/526 for appendage to subsequent messages. Steps 720 through 730 are then repeated as many times as necessary to complete the thread.

In step 720, user 555 instructs Applet 521/526 to transmit to server 590 a transaction packet for processing by database 170. Appended to the packet is the unique thread ticket value assigned to the present thread in step 716. In step 722, the server receives the packet, detects the ticket, and compares the ticket number with those stored in local memory. If the ticket number in question does not match any of those in memory, the process returns in step 724 to step 606 in which the message is treated as a log-in request and a new queuing ticket number is generated. If however, a match is located, the process continues in step 726 in which the server and the database process the packet. Upon completion of the processing, a response is returned to Applet 521/526 in step 528. If the user chooses to terminate the thread at this point, the process ends at step 730. If, however, the customer chooses to continue, steps 720 through 730 are repeated.

What is claimed is:

1. A method for queuing messages between a first computer configured to send and receive messages and a second computer configured to send and receive messages, the method comprising:

sending from the first computer to the second computer a first message;

in response to the second computer receiving the first message, sending from the second computer to the first computer a second message comprising an indication of a first period of time, during which the second computer performs a task; and in response to the first computer receiving the second message and a determination that the first period of time has expired, sending from the first computer to the second computer a third message; and wherein the first period of time is determined responsive to a ratio of a number of tasks to be performed during the first period of time and a predetermined maximum number of tasks to be performed during a predetermined maximum period of time.

2. The method of claim 1 wherein the second message comprises a first ticket containing a ticket value, and the third message comprises a second ticket containing the ticket value.

3. The method of claim 2 further comprising:

storing the ticket value in a storage configured to be accessed by the second computer;

in response to the second computer receiving the third message, determining whether the ticket value from the second ticket matches the ticket value in the storage; and, in response to a determination that the ticket value from the second ticket matches the ticket value in the storage, servicing the third message with the second computer.

4. The method of claim 3 wherein the ticket value is stored with a set of ticket values held in the storage.

5. The method of claim 4 further comprising:

in response to the second computer receiving a fourth message, determining whether the fourth message comprises a third ticket;

in response to a determination that the fourth message comprises a third ticket, determining whether the ticket value from the third ticket matches one from the set of ticket values; and in response to a determination that the ticket value from the third ticket matches one from the set of ticket values, servicing the fourth message.

6. The method of claim 5 further comprising:

in response to the second computer receiving a fourth message, determining whether the fourth message comprises a third ticket; and in response to a determination that the fourth message does not comprise a third ticket, sending from the second computer to a third computer a fifth message comprising an indication of a second period of time; and wherein the fourth message is sent to the second computer from the third computer.

7. The method of claim 6 wherein the first period of time and the second period of time are selected to form a temporal queue.

8. The method of claim 1 wherein the first period of time is determined responsive to a product of the ratio and the predetermined maximum period of time.

9. The method of claim 4 wherein the task comprises servicing an additional message.

10. The method of claim 1 wherein:

the first computer is a client computer configured to send and receive messages over a network;

the second computer is a server computer configured to send and receive messages over the network;

the first message is a log-in request;

the second message is a queuing response indicative of a position in a temporal queue; and the third message is a log-in authorization packet.

11. The method of claim 10 further comprising:

in response to the server computer receiving the log-in request, determining whether the server computer is servicing a predetermined maximum number of messages; and in response to a determination that the server computer is servicing the predetermined maximum number of messages, performing the step of sending the queuing response.

12. The method of claim 1 further comprising:

sending from a third computer to the second computer a fourth message; and in response to the second computer receiving the fourth message, sending from the second computer to the third computer a fifth message comprising an indication of a second period of time.

13. The method of claim 12 wherein the first period of time and the second period of time are selected to form a temporal queue.

14. A method for queuing messages to a first computer configured to send and receive messages, the method comprising:

receiving from a second computer a first message;

sending to the second computer a second message comprising an indication of a first period of time, during which, the first computer performs a task; and receiving from the second computer a third message sent in response to determination that the first period of time has expired; and wherein the first period of time is determined from a ratio of the number of tasks to be performed during the first period of time and a predetermined maximum number of tasks to be performed during a predetermined maximum period of time.

15. The method of claim 14 wherein the second message comprises a first ticket containing a ticket value, and the third message comprises a second ticket containing the ticket value.

16. The method of claim 15 further comprising:

storing the ticket value in a storage configured to be accessed by the first computer;

in response to the first computer receiving the third message, determining whether the ticket value from the second ticket matches the ticket value in the storage; and in response to a determination that the ticket value from the second ticket matches the ticket value in the storage, servicing the third message with the first computer.

17. The method of claim 16 wherein the ticket value is stored with a set of ticket values held in the storage.

18. The method of claim 17 further comprising:
in response to the first computer receiving a fourth message, determining whether the fourth message comprises a third ticket;
in response to a determination that the fourth message comprises a third ticket, determining whether the ticket value from the third ticket matches one from the set of ticket values; and
in response to a determination that the ticket value from the third ticket matches one from the set of ticket values, servicing the fourth message.

19. The method of claim 15 further comprising:
in response to the first computer receiving a fourth message, determining whether the fourth message comprises a third ticket; and
in response to a determination that the fourth message does not comprise a third ticket, sending from the first computer to a third computer a fifth message comprising an indication of a second period of time; and
wherein the fourth message is sent to the first computer from the third computer.

20. The method of claim 19 wherein the first period of time and the second period of time are selected to form a temporal queue.

21. The method of claim 14 wherein the first period of time is determined from the product of the ratio and the predetermined maximum period of time.

22. The method of claim 14 wherein the task comprises servicing an additional message.

23. The method of claim 14 wherein:
the first computer is a server computer configured to send and receive messages over a network;
the first message is a log-in request;
the second message is a queuing response indicative of a position in a temporal queue; and
the third message is a log-in authorization packet.

24. The method of claim 23 further comprising:
in response to the server computer receiving the log-in request, determining whether the server computer is servicing a predetermined maximum number of messages; and
in response to a determination that the server computer is servicing the predetermined maximum number of messages, performing the step of sending the queuing response.

25. The method of claim 14 further comprising:
sending from a third computer to the first computer a fourth message; and
in response to the first computer receiving the fourth message, sending from the first computer to the third computer a fifth message comprising an indication of a second period of time.

26. The method of claim 25 wherein the first period of time and the second period of time are selected to form a temporal queue.

* * * * *